United States Patent
Yamada et al.

(10) Patent No.: US 8,494,266 B2
(45) Date of Patent: Jul. 23, 2013

(54) IMAGE PROCESSING APPARATUS, IMAGE PROCESSING METHOD, AND COMPUTER-READABLE RECORDING MEDIUM

(75) Inventors: Toshiyuki Yamada, Kanagawa (JP); Kiyotaka Tsuchibuchi, Kanagawa (JP); Junichi Shimizu, Kanagawa (JP); Minoru Sodeura, Kanagawa (JP); Masato Saito, Kanagawa (JP); Hiroshi Niina, Kanagawa (JP); Zhenrui Zhang, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 289 days.

(21) Appl. No.: 13/011,486

(22) Filed: Jan. 21, 2011

(65) Prior Publication Data
US 2012/0063683 A1 Mar. 15, 2012

(30) Foreign Application Priority Data
Sep. 9, 2010 (JP) ................................. 2010-202224

(51) Int. Cl.
*G06K 9/4647* (2006.01)
(52) U.S. Cl.
USPC ............ 382/170; 382/172; 382/173; 382/190

(58) Field of Classification Search
USPC ................. 382/173, 172, 156, 190, 195, 254, 382/272, 284, 298, 300; 375/E7.04; 348/E5.135; 358/434, 448; 235/454; 313/310, 313/495, 496, 497
See application file for complete search history.

(56) References Cited

U.S. PATENT DOCUMENTS

| 4,742,558 A * | 5/1988 | Ishibashi et al. | 382/240 |
| 6,437,881 B1 * | 8/2002 | Baba et al. | 358/434 |
| 7,046,862 B2 * | 5/2006 | Ishizaka et al. | 382/298 |
| 2005/0145922 A1 | 7/2005 | Farley et al. | |

FOREIGN PATENT DOCUMENTS
JP A-2005-197691 7/2005

* cited by examiner

*Primary Examiner* — Anh Do
(74) *Attorney, Agent, or Firm* — Oliff & Berridge, PLC

(57) ABSTRACT

An image processing apparatus includes a separating unit, a setting unit, and a determining unit. The separating unit separates an image into types of partial images other than a specific type, which is likely to be erroneously separated. The setting unit makes setting designating whether or not predetermined two types of partial images of the separated partial images are to be easily determined to be partial images of the specific type. The determining unit determines whether or not at least one of the predetermined two types of the partial images is the partial image of the specific type or not based upon the setting.

15 Claims, 15 Drawing Sheets

| | TABLE | CG |
|---|---|---|
| NUMBER OF RULED LINES (IF MORE THAN OR EQUAL TO SET VALUE, DETERMINED TO BE TABLE) | a1 | c1 |
| NUMBER OF CONTACT POINTS OF RULED LINE (IF MORE THAN OR EQUAL TO SET VALUE, DETERMINED TO BE TABLE) | a2 | c2 |
| NUMBER OF INTERSECTIONS OF RULED LINE (IF MORE THAN OR EQUAL TO SET VALUE, DETERMINED TO BE TABLE) | a3 | c3 |
| LINEARITY OF RULED LINE (VARIANCE OF WIDTH, DIFFERENCE BETWEEN MAXIMUM VALUE AND MINIMUM VALUE OF WIDTH. IF LESS THAN OR EQUAL TO SET VALUE, DETERMINED TO BE TABLE) | a4 | c4 |

FIG.7

| AREA | JANUARY | FEBRUARY | MARCH |
|---|---|---|---|
| TOKYO | | | |
| KANAGAWA | | | |
| CHIBA | | | |
| SAITAMA | | | |

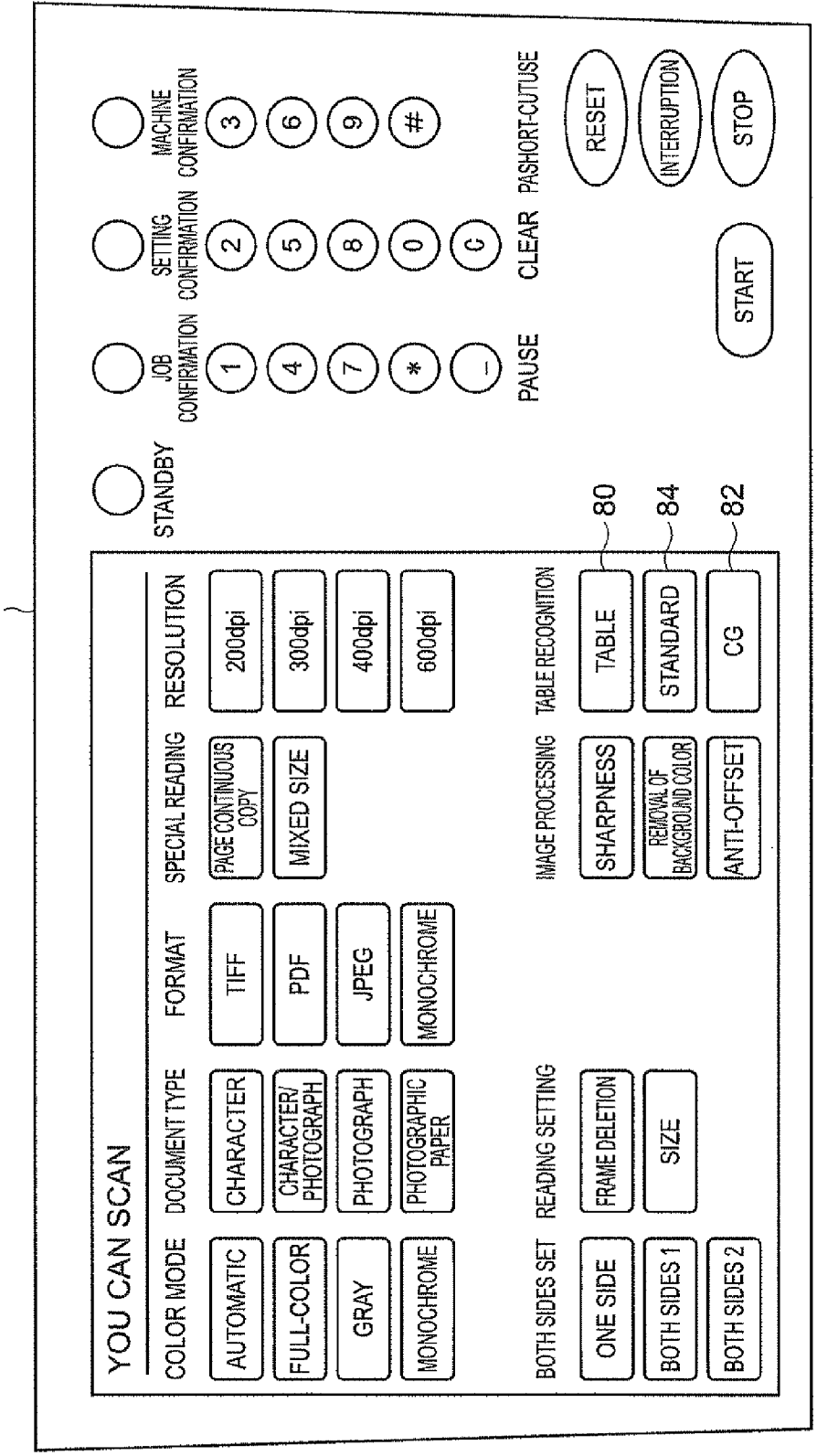

FIG.11

|  | TABLE | STANDARD | GRAPHIC |
|---|---|---|---|
| NUMBER OF RULED LINES (IF MORE THAN OR EQUAL TO SET VALUE, DETERMINED TO BE TABLE) | a1 | b1 | c1 |
| NUMBER OF CONTACT POINTS OF RULED LINE (IF MORE THAN OR EQUAL TO SET VALUE, DETERMINED TO BE TABLE) | a2 | b2 | c2 |
| NUMBER OF INTERSECTIONS OF RULED LINE (IF MORE THAN OR EQUAL TO SET VALUE, DETERMINED TO BE TABLE) | a3 | b3 | c3 |
| LINEARITY OF RULED LINE (VARIANCE OF WIDTH, DIFFERENCE BETWEEN MAXIMUM VALUE AND MINIMUM VALUE OF WIDTH. IF LESS THAN OR EQUAL TO SET VALUE, DETERMINED TO BE TABLE) | a4 | b4 | c4 |

|  | TABLE | STANDARD | GRAPHIC |
|---|---|---|---|
| MAXIMUM CONTINUOUS PIXEL LENGTH OF LINE OR OUTLINE (IF MORE THAN OR EQUAL TO SET VALUE, DETERMINED TO BE RULED LINE) | a1 | b1 | c1 |
| DISTANCE BETWEEN LINES OR OUTLINES (IF MORE THAN OR EQUAL TO SET VALUE, DETERMINED TO BE RULED LINE) | a2 | b2 | - |
| MAXIMUM PIXEL WIDTH OF BRAKE OF LINE OR OUTLINE (IF LESS THAN OR EQUAL TO SET VALUE, DETERMINED TO BE RULED LINE) | a3 | b3 | c3 |
| TOTAL PIXEL WIDTH OF BRAKE OF LINE OR OUTLINE (IF LESS THAN OR EQUAL TO SET VALUE, DETERMINED TO BE RULED LINE) | a4 | b4 | c4 |
| AVERAGE PIXEL WIDTH OF BRAKE OF LINE OR OUTLINE (IF LESS THAN OR EQUAL TO SET VALUE, DETERMINED TO BE RULED LINE) | a5 | b5 | c5 |

FIG.15

|  | TABLE | STANDARD | GRAPHIC |
|---|---|---|---|
| THRESHOLD VALUE | a1 | b1 | c1 |

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based on and claims priority under 35USC 119 from Japanese Patent Application No. 2010-202224 filed Sep. 9, 2010.

BACKGROUND

Technical Field

The present invention relates to an image processing apparatus, an image processing method, and a computer-readable recording medium.

SUMMARY

According to an aspect of the invention, there is provided an image processing apparatus including: a separating unit that separates an image, which includes a plurality of types of partial image, into types of partial image other than a predetermined specific type that is designated as likely to be erroneously separated; a setting unit that makes a setting designating whether or not a predetermined two types of partial image of the partial images separated by the separating unit are to be easily determined to be partial images of the predetermined specific type; and a determining unit that determines whether or not at least one of the predetermined two types of partial image is a partial image of the predetermined specific type based on the setting made by the setting unit.

BRIEF DESCRIPTION OF THE DRAWINGS

Exemplary embodiments of the present invention will be described in detail based on the following figures, wherein:

FIG. 4 is a view illustrating one example of a table determination parameter according to the first exemplary embodiment;

FIG. 7 is a view illustrating one example of a table;

FIG. 10 is a view illustrating one example of a menu screen;

FIG. 11 is a view illustrating one example of a table determination parameter;

FIG. 13 is a view illustrating one example of a ruled line extraction parameter;

FIG. 15 is a view illustrating one example of a threshold value used for a density determination by a density determining unit.

DETAILED DESCRIPTION (First Exemplary Embodiment)

A first exemplary embodiment of the present invention will be described below.

Figure 1:
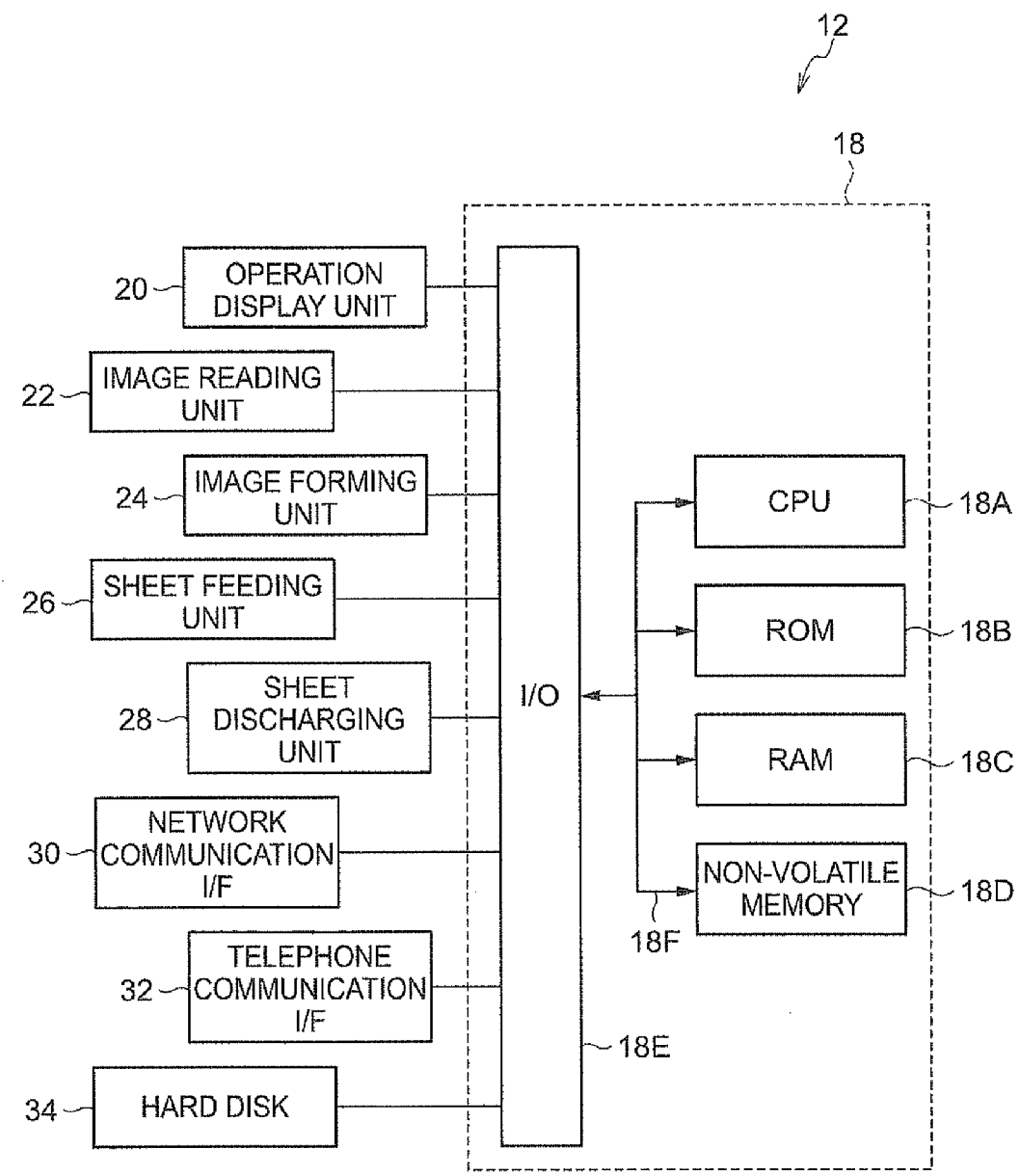
FIG. 1 is a schematic block diagram illustrating an image forming apparatus.

FIG. 1 illustrates a schematic configuration of an image forming apparatus 12. As illustrated in FIG. 1, the image forming apparatus 12 includes a computer 18.

The computer 18 includes a CPU (Central Processing Unit) 18A, a ROM (Read Only Memory) 18B, a RAM (Random Access Memory) 18C, a non-volatile memory 18D, and an input/output interface (I/O) 18E, those of which are interconnected via a bus 18F.

The respective functional units, which are an operation display unit 20, an image reading unit 22, an image forming unit 24, a sheet feeding unit 26, a sheet discharging unit 28, a network communication interface (I/F) 30, a telephone communication interface (I/F) 32, a hard disk 34 and the like are connected to the I/O 18E.

The operation display unit 20 includes various buttons such as a start button for giving an instruction of a start of a copy and a ten-key, and a touch panel that displays a setting screen for setting various image forming conditions such as a density of a copy and various screens displaying a condition of the apparatus and the like.

The image reading unit 22 includes an image reading sensor such as a line CCD and a scanning mechanism for scanning the image reading sensor, and the image reading unit 22 reads an image of an original document set to the apparatus.

The image forming unit 24 forms an image on a recording medium with, for example, a so-called electrophotographic system. Specifically, the image forming unit 24 includes a charging device for charging a photosensitive drum, an exposure device that irradiates light, according to the image, onto the charged photosensitive drum so as to form an electrostatic latent image according to the image onto the photosensitive drum, a developing device that develops the electrostatic latent image, formed on the photosensitive drum, with toner, a transferring device that transfers the toner image formed on the photosensitive drum according to the image onto a recording medium, and a fixing device that fixes the toner image transferred onto the recording medium according to the image.

Examples of the exposure device include an optical scanning device configured to include an optical system such as a semiconductor laser, a rotating polygon mirror, a collimator lens or a cylindrical lens, and fθ lens, and an LED head including plural LEDs.

The sheet feeding unit 26 includes a sheet accommodating unit on which recording sheets are accommodated, and a feed mechanism which feeds a recording sheet to the image forming unit 24 from the sheet accommodating unit and the like.

The sheet discharging unit 28 includes a discharge unit to which the recording sheet is discharged, and a discharge mechanism that discharges the recording sheet, having an image formed thereon by the image forming unit 24, onto the discharge unit and the like.

The network communication I/F 30 is an interface that performs data communication with an external server 14 via a network 16.

The telephone communication interface I/F 32 is an interface that performs a facsimile communication with other image forming apparatus connected through an unillustrated telephone line.

The hard disk 34 stores log data such as a condition and an operational status of the respective units of the apparatus and the like, log data of a processing result of a copy, facsimile communication, print and the like, image data of the image read by the image reading unit 22, various setting data, and processing program and the like.

The computer 18 also has a function as an object separating unit 18A that reads the image, such as the image read by the image reading unit 22, stored on the hard disk 34, and various types of separates objects (partial images) included in the image based upon the read image data. Examples of the objects include a table object, a CG (computer graphics) object, a line-image object, a photograph object, a character object and the like.

The CPU 18A of the computer 18 reads and executes an object separation processing program stored in the hard disk 34, whereby the computer 18 functions as the object separating unit 18. The object separation processing program may be provided by a recording medium such as a CD-ROM.

Figure 2:
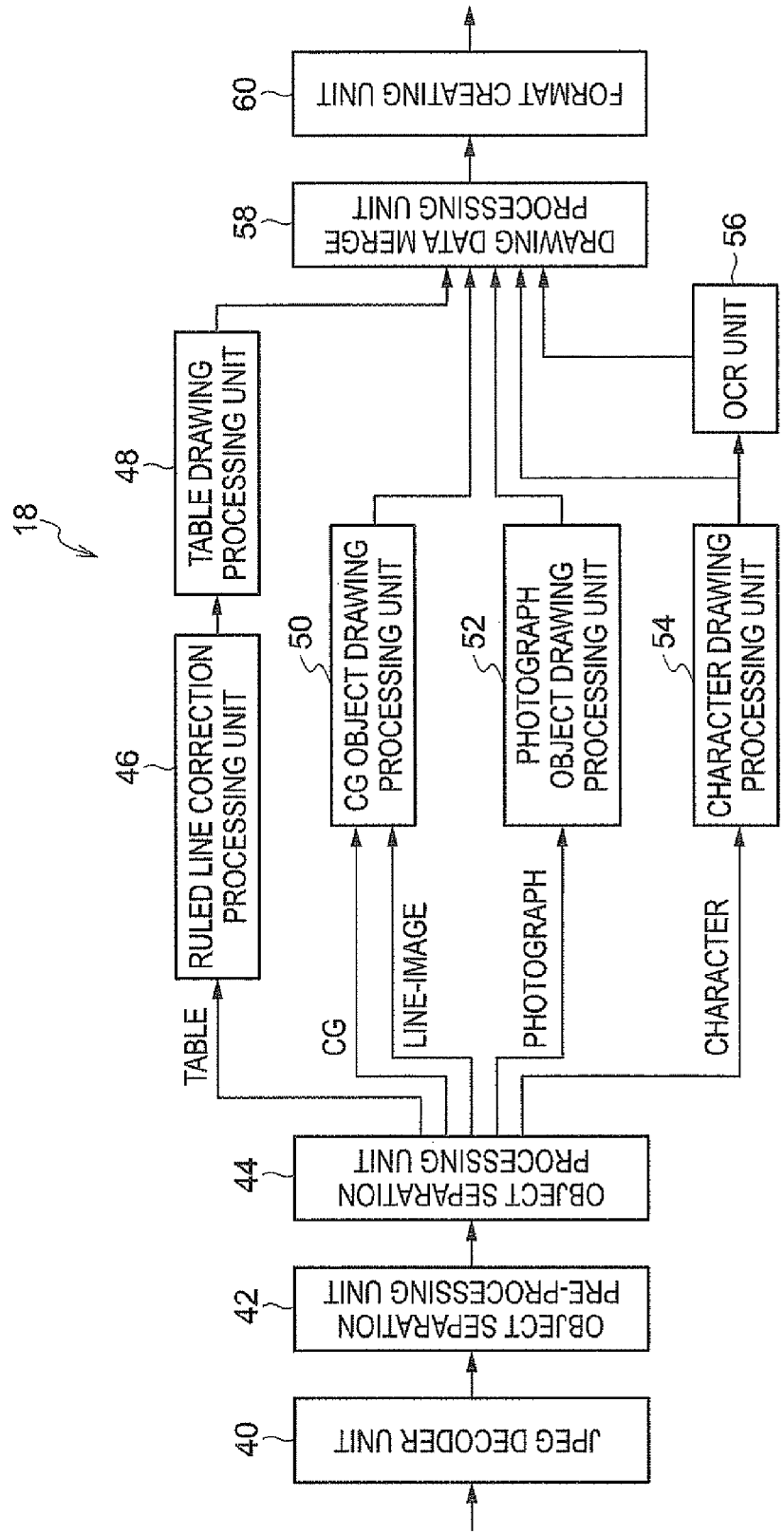
FIG. 2 is a functional block diagram illustrating an object separating unit.

FIG. 2 illustrates a functional block diagram of the object separating unit 18. As illustrated in FIG. 2, the object separating unit 18 includes a MEG decoder unit 40, an object separation pre-processing unit 42, an object separation processing unit 44, a ruled line correction processing unit 46, a table drawing processing unit 48, a CG object drawing processing unit 50, a photograph object processing unit 52, a character drawing processing unit 54, an OCR unit 56, a drawing data merge processing unit 58, and a format creating unit 60.

The MPG decoder unit 40 decodes the image, which is read from the hard disk 34 and which is compressed according to a JPEG format, into a non-compressed image, and outputs the decoded image data to the object separation pre-processing unit 42.

The object separation pre-processing unit 42 performs various pre-processing, such as a predetermined filter processing and/or tone correction processing, to the image data (e.g., a bit map) of the non-compressed image decoded by the JPEG decoder unit 40, and outputs the resultant image data to the object separation processing unit 44.

Although the detail is described later, the object separation processing unit 44 separates a table object, a CG object, a line-image object, a photograph object, and a character object, those of which are included in the image, based upon the image data processed by the object separation pre-processing unit 42. The object separation processing unit 44 outputs the object data of the table object to the ruled line correction processing unit 46, outputs the object data of the CG object and the line-image object to the CG object drawing processing unit 50, outputs the object data of the photograph object to the photograph object drawing processing unit 50, and outputs the object data of the character object to the character drawing processing unit 54.

The ruled line correction processing unit 46 performs a predetermined ruled line correction processing to the table object data, and outputs the resultant data to the table drawing processing unit 48.

A processing of changing a dotted line in the table object to a solid line is included in the ruled line correction processing, for example. Specifically, it is determined whether a line, which repeats on and off with a constant interval, is present or not in the table object, i.e., it is determined whether an on-pixel (a pixel to be drawn) and an off-pixel (a pixel not to be drawn) are repeated or not with a constant interval, and when the on-pixel and the off-pixel are repeated with a constant interval, the off-pixel is rewritten to the on-pixel. With this processing, the dotted line is changed to the solid line.

There is also a processing for separating a ruled line and a character if the ruled line and the character are in contact with each other. However, the ruled line correction processing is not limited to the processing.

The table drawing processing unit 48 rasterizes the inputted table object data to create layer data, creates actual object data for the layer data of each layer, and outputs the resultant data to the drawing data merge unit 58.

The CG object drawing processing unit 50, the photograph object drawing processing unit 52, and the character drawing processing unit 54 perform the processing similar to that of the table drawing processing unit 48 to the inputted object data, and output the resultant data to the drawing data merge unit 58.

The character drawing processing unit 54 also outputs the data, which is subject to the drawing processing, to the OCR unit 56. The OCR unit 56 performs an OCR (Optical Character Recognition) processing, i.e., a character recognition processing, to the inputted data, and outputs the character data, which is the result of the character recognition, to the drawing data merge unit 58.

The drawing data merge processing unit 58 merges the drawing data and the OCR data outputted from the table drawing processing unit 48, the CG object drawing processing unit 50, the photograph object drawing processing unit 52, the character drawing processing unit 54, and the OCR unit 56.

The format creating unit 60 creates header information based upon the data merged at the drawing data merge processing unit 58, and collects the merged data and the header information as one file of a predetermined format. The header information includes information for taking out desired object data from the merged data, i.e., information of a pointer (address) of the respective object data included in the merged data.

Next, the object separation processing unit 44 will be described.

Figure 3:
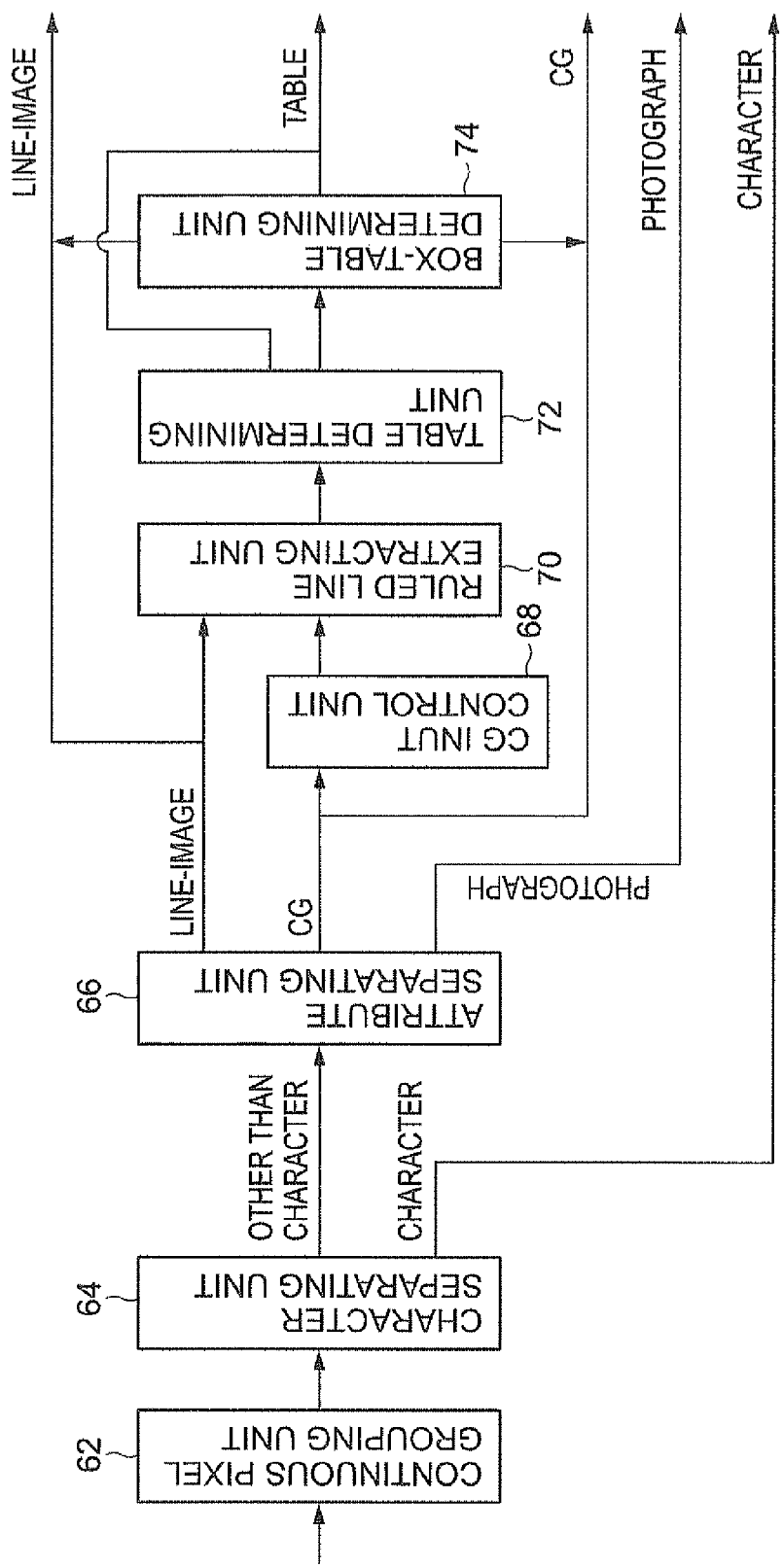
FIG. 3 is a functional block diagram illustrating an object separation processing unit according to a first exemplary embodiment.

FIG. 3 illustrates a functional block diagram of the object separation processing unit 44. As illustrated in FIG. 3, the object separation processing unit 44 configured to include a continuous pixel grouping unit 62, a character separating unit 64, an attribute separating unit 66, a CG input controller 68, a ruled line extracting unit 70, a table determining unit 72, and a box-table determining unit 74.

The continuous pixel grouping unit 62 scans the image data inputted from the object separation pre-processing unit 42 so as to extract the continuous pixel group of substantially the same color, and applies an ID to the pixel group, which is defined as one group.

The character separating unit 64 separates the pixel group, which is determined to be a character, as a character object, and the other pixel groups as objects other than the character, from the characteristic of the respective pixel groups to which the ID is applied. Various known processing may be employed as the separating processing of a character. The object data of the object other than characters is outputted to the attribute separating unit 66.

The attribute separating unit 66 determines which the object other than characters is, i.e., the line-image object, the CG object, or the photograph object, and applies the attribute. With this processing, the attribute is applied to the objects other than characters, so that the image data is separated into the line-image object, the CG object, and the photograph object.

The object data of the line-image object is outputted to the ruled line extracting unit 70, and the object data of the CG object is outputted to the CG input controller 68.

The ruled line extracting unit 70 extracts pixels continuous in the longitudinal direction and lateral direction, i.e., extracts whether a straight line is present or not, and outputs the result to the table determining unit 72 as a ruled line extraction result, together with the object data.

The table determining unit 72 determines whether the data is a table or not based upon the ruled line extraction result of the ruled line extracted by the ruled line extracting unit 70 and a table determination parameter 76 illustrated in FIG. 4. This determination is different, for example, between a case in which a "table" button 80 and a case in which a "CG" button 82 is depressed in setting items for a table recognition processing is depressed on a menu screen 78 displayed on the operation display unit 20 illustrated in FIG. 5.

The "table" button 80 is depressed when a user wishes that a table object in an original document is easy to be recognized as a table object, when the original document to be read is read to perform the object separation.

The "CG" button 82 is depressed when a user wishes that a CG object in an original document is easy to be recognized as a CG object, when the original document to be read is read to perform the object separation.

Accordingly, when the "table" button 80 is depressed, a table object is easier to be recognized as a table object, compared to a case in which the "CO" button 82 is depressed, whereby it is suppressed that the table object is recognized as an other type of object.

When the "CG" button 82 is depressed, a CG object is easier to be recognized as a CG object, compared to a case in which the "table" button 80 is depressed, whereby it is suppressed that the CG object is recognized as an other type of object.

The information indicating as to which button of these buttons is depressed is inputted to the table determining unit 72.

The table determining unit 72 determines whether the object is a table object or not based upon the table determination parameter 76 illustrated in FIG. 4, which is set beforehand for every setting in the table recognition processing, for example.

FIG. 4 illustrates "a number of ruled lines", "a number of connection points of ruled lines", "a number of intersections of ruled lines", and "linearity of a ruled line" as one example of the table determination parameters. However, the invention is not limited thereto.

As illustrated in FIG. 4, different set values (threshold values) a1 to a4 and c1 to c4 to respective table determination parameters between a case in which the "table" button 80 is depressed and a case in which the "CG" button 82 is depressed. These setting values are respectively set such that, when the "table" button 80 is depressed, the inputted object is easy to be determined as a table object, and when the "CG" button 82 is depressed, the inputted object is easy to be determined as a CG object.

In the present exemplary embodiment, the relationships in the magnitudes of the respective setting values are set to be $a1<c1$, $a2<c2$, $a3<c3$, and $a4>c4$, for example.

Figure 5:
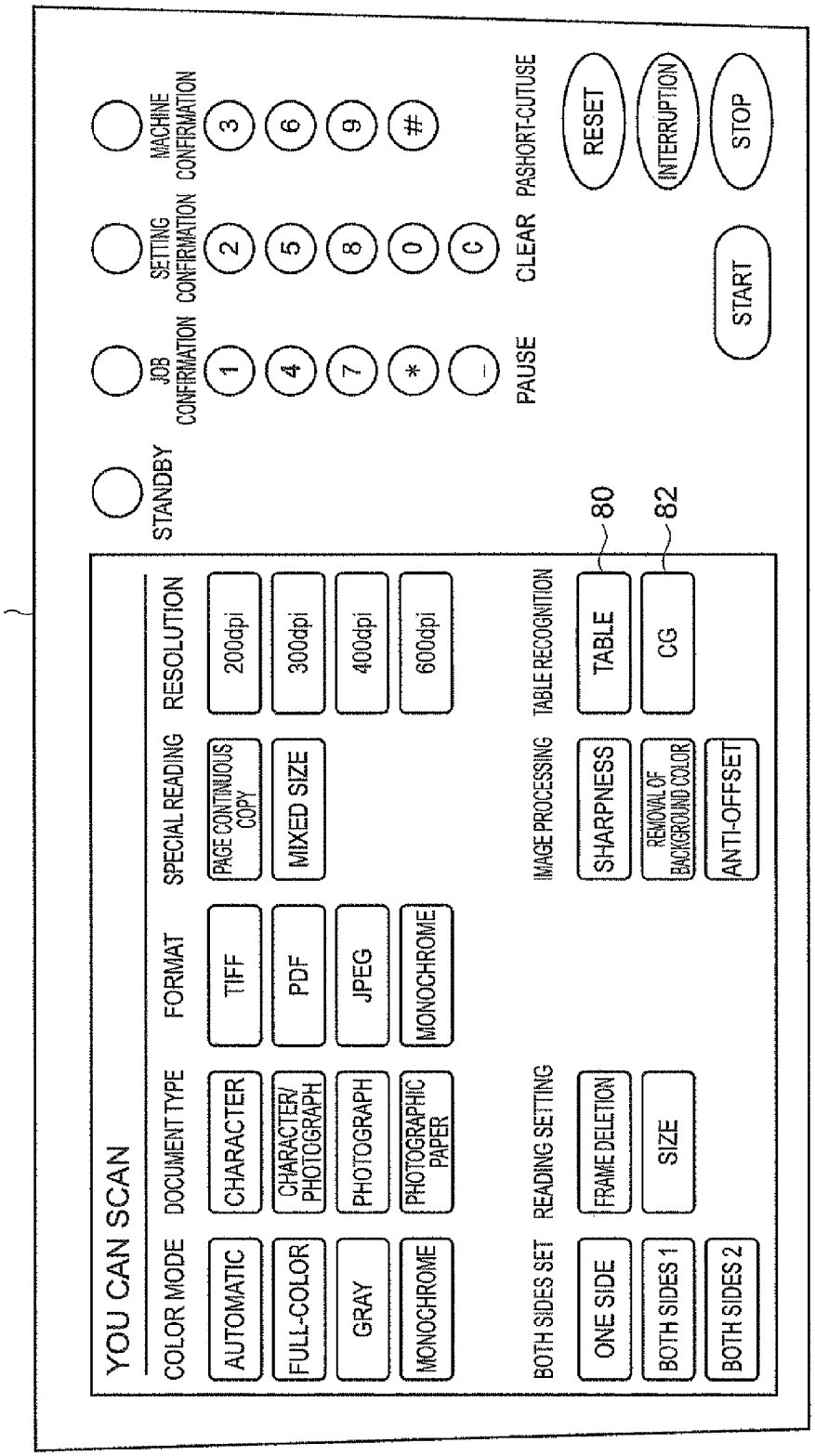
FIG. 5 is a view illustrating one example of a menu screen.

For example, when the setting values al and el are set for "the number of ruled lines" as illustrated in FIG. 4, the table determining unit 72 obtains the number of the ruled lines extracted by the ruled line extracting unit 70 so as to compare the obtained number of the ruled lines and the setting value al or cl corresponding to the setting in the table recognition processing set by a user on the menu screen 78 illustrated in FIG. 5, and if the obtained number of the ruled lines is the setting value or more, the table determining section 72 determines that the object is a table object.

If the set values a2 and c2 are set for "the number of connection points of ruled lines" as illustrated in FIG. 4, the table determining unit 72 obtains the number of the connection points of the ruled lines extracted by the ruled line extracting unit 70, compares the obtained number of the connection points of the ruled lines and the setting value a2 or c2 corresponding to the setting in the table recognition processing set by a user, and determines that the object is a table object if the obtained number of the connection points of the ruled lines is the setting value or more.

If the setting values a3 and c3 are set for "the number of intersections of ruled lines" as illustrated in FIG. 4, the table determining unit 72 obtains the number of the intersections of the ruled lines extracted by the ruled line extracting unit 70, compares the obtained number of the intersections of the ruled lines and the setting value a3 or c3 corresponding to the setting in the table recognition processing set by a user, and determines that the object is a table object if the obtained number of the intersections of the ruled lines is the setting value or more.

If the setting values a4 and c4 are set for "the linearity of a ruled line" as illustrated in FIG. 4, the table determining unit 72 obtains the variance of the width of the ruled line extracted by the ruled line extracting unit 70 and/or the difference between the maximum value and the minimum value of the width of the ruled line as a parameter indicating the linearity of the ruled line, and compares the obtained parameter indicating the linearity of the ruled line and the setting value a4 or c4 corresponding to the setting in the table recognition processing set by a user, and determines that the object is a table object if the obtained parameter indicating the linearity of the ruled line is the set value or less.

The table determining unit 72 compares the respective table determination parameters and the setting values, and finally determines whether the inputted line-image object or the CG object is a table object or not based upon the respective comparison results. For example, if the object is determined to be a table object for all table determination parameters, the table determining unit 72 finally determines that the object is a table object.

If the table determining unit 72 determines that the object is a table, the inputted object is specified as the table object, and the table determining unit 72 outputs the object data to the following ruled line correction processing unit 46. On the other hand, if the table determining unit 72 determines that the object is not a table, it outputs the ruled line extraction result of the ruled line extracted by the ruled line extracting unit 70 to the box-table determining unit 74.

Figure 6:
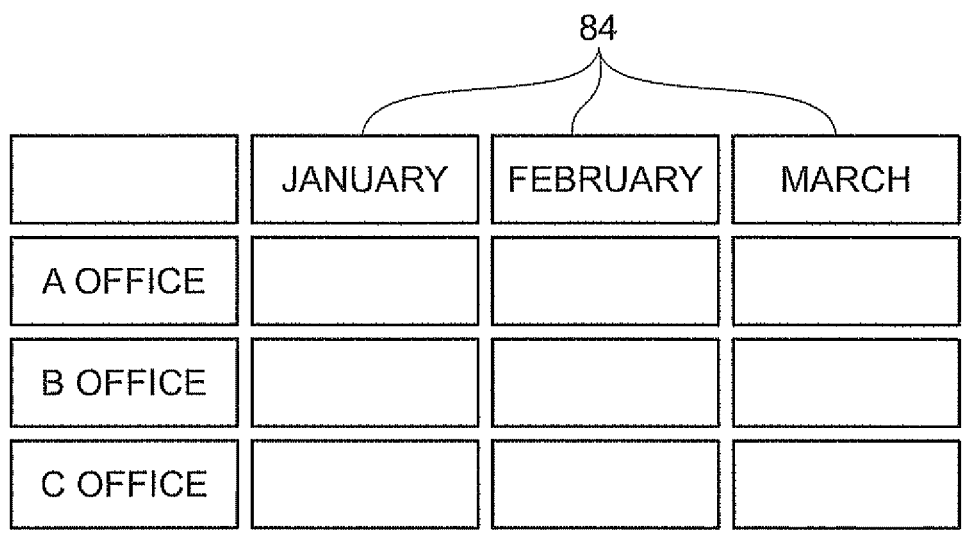
FIG. 6 is a view illustrating one example of a box-table.

The box-table determining unit 74 determines whether the object is a box-table object or not based upon the ruled line extraction result. The box-table refers to a table which includes plural rectangular objects 84 as illustrated in FIG. 6. A general table object refers to an object which includes plural ruled lines crossing each other as illustrated in FIG. 7.

The box-table determining unit 74 determines whether the object is a box-table or not as to an object constituting a rectangular closed region, i.e., a rectangular object, in the object group that is determined to be a line constituting CG The box-table determining unit 74 calculates a distance between a certain apex of the rectangular object that is firstly attracted and an apex of another rectangular object adjacent to this apex, and if the distance is a predetermined threshold value or less, a processing of adding a point indicating a box-table likeness is executed for all apexes of all rectangular objects. If the calculated point is a predetermined threshold value or more, the box-table determining unit 74 determines that the rectangular object is a box-table.

As to the object that is not determined to be a box-table by the box-table determining unit 74, it is outputted to the CG object drawing processing unit 50 as a line-image object, if it is originally a line-image object. If the object is originally a CG object, it is outputted to the CG object drawing processing unit 50 as a CG object.

The CG input controller 68 performs different processing between a ease in which the "table" button 80 is depressed, for example, among the setting items for the table recognition processing on the menu screen 78 displayed on the operation display unit 20, and a case in which the "CG" button 82 is depressed. The information indicating which one of these buttons is depressed is inputted to the CG input controller 68.

If the "table" button 80 is depressed, the CG input controller 68 outputs the CG object data inputted from the attribute separating unit 66 to the ruled line extracting unit 70. If the "CG" button 82 is depressed, the CG input controller 68 does not output the CG object data inputted from the attribute separating unit 66 to the ruled line extracting unit 70. Note that the CG object data is outputted to the CG object drawing processing unit 50 from the attribute separating unit 66.

As described above, if the "table" button 80 is depressed, the CG object data is outputted to the ruled line extracting unit 70, and when the "CG" button 82 is depressed, the CG object data is not outputted to the ruled line extracting unit 70. Therefore, if the "table" button 80 is depressed, the CG object is easy to be recognized as a table, and if the "CG" button 82 is depressed, the CG object is easy to be recognized as a CG object.

Figure 8:
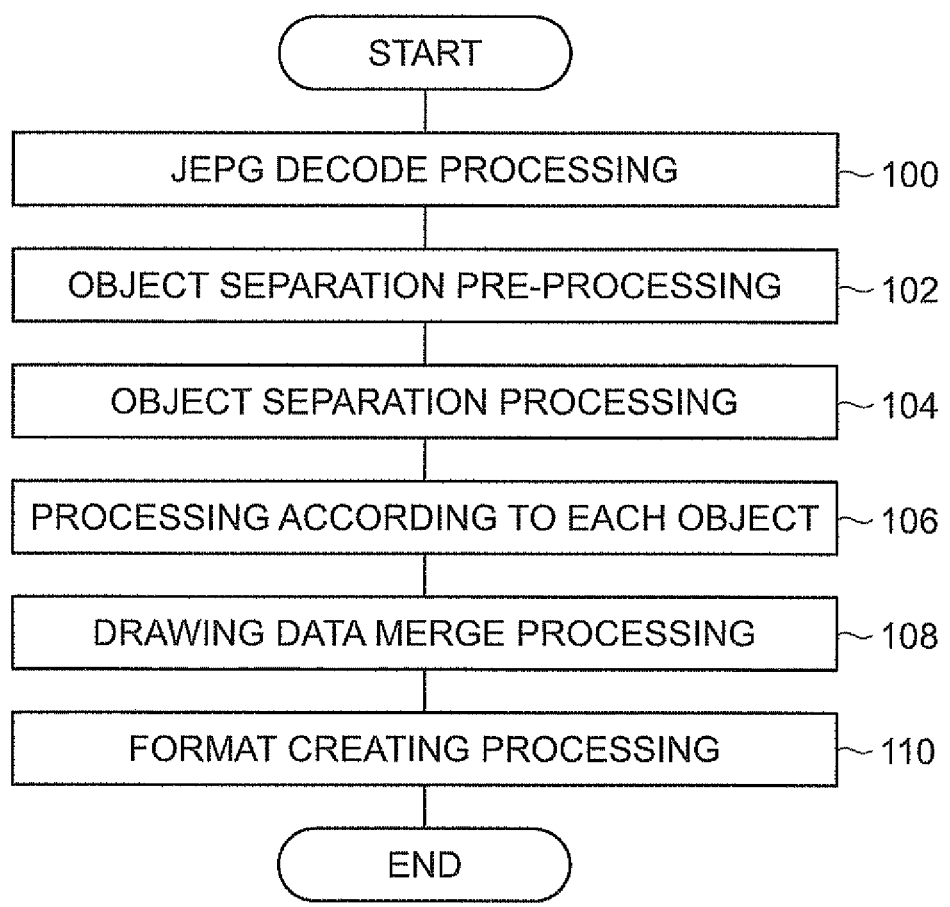
FIG. 8 is a flowchart of a processing executed by the object separating unit.

Next, a processing executed by the object separating unit 18 will be described with reference to a flowchart illustrated in FIG. 8.

In step 100, the JPEG decoder unit 40 performs the above-mentioned JEPG decode processing.

In step 102, the object separation pre-processing unit 42 executes the above-mentioned object separation pre-processing.

In step 104, the object separation processing unit 44 executes the above-mentioned object separation processing.

In step 106, the processing for each of the objects separated by the object separation processing unit 44 is executed. Specifically, the ruled line correction processing unit 46 executes the above-mentioned ruled line correction processing for the table object, and the table drawing processing unit 48 executes the above-mentioned table drawing processing.

The CG object drawing processing unit 50 executes the above-mentioned CG object drawing processing for the CG object and the line-image object.

The photograph object drawing processing unit 52 executes the above-mentioned photograph object drawing processing for the photograph object.

The character drawing processing unit 54 executes the above-mentioned character drawing processing for the character object, and the OCR unit executes the above-mentioned OCR processing.

In step 108, the drawing data merge processing unit 58 executes the above-mentioned drawing data merge processing.

In step 110, the format creating unit 60 executes the above-mentioned format creating processing.

(Second Exemplary Embodiment)

Next, a second exemplary embodiment of the present invention will be described. The components same as those in the first exemplary embodiment are identified by the same numerals, and the detailed description will be omitted.

Figure 9:
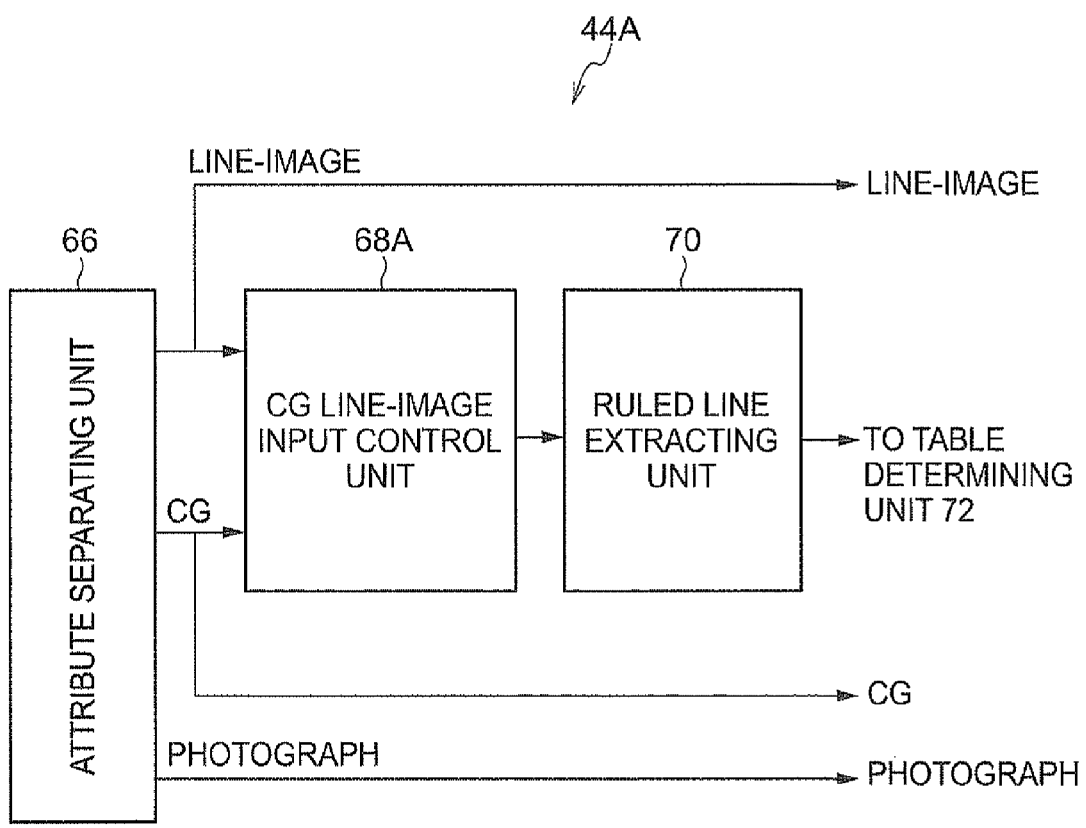
FIG. 9 is a functional block diagram of an object separation processing unit according to a second exemplary embodiment.

FIG. 9 illustrates a functional block diagram of an object separation processing unit 44A according to the present exemplary embodiment. The different point of the object separation processing unit 44A from the object separation processing unit 44 illustrated in FIG. 3 is that a CG line-image input controller 68A is provided between the attribute separating unit 66 and the ruled line extracting unit 70, instead of the CG input controller 68. In FIG. 9, the continuous pixel grouping unit 62, the character separating unit 64, the table determining unit 72, and the box-table determining unit 74 are not illustrated.

In the present exemplary embodiment, a menu screen 78A illustrated in FIG. 10 is displayed on the operation display unit 20. The processing is different depending upon a case in which the "table" button 80 is depressed, a case in which a "standard" button 86 is depressed, and a case in which the "CG" button 82 is depressed, among the setting items for the table recognition processing.

As described above, the "table" button 80 is a button that is depressed when a user wishes that a table object in an original document is easy to be recognized as a table object when the original document to be read is read to perform the object separation.

As described above, the "CG" button 82 is a button that is depressed if a user wishes that a CG object in an original document is easy to be recognized as a CG object when the original document to be read is read to perform the object separation.

The "standard" button 86 is a button that is depressed if a user wishes that a standard processing between a case in which the "table" button 80 is depressed and a case in which the "CG" button 82 is depressed is executed, when the original document to be read is read to perform the object separation.

The CG line-image input controller 68A outputs the CG object data and the line-image object data inputted from the attribute separating unit 66 to the ruled line extracting unit 70, if the "table" button 80 is depressed. The CG line-image input controller 68A does not output the CG object data and the line-image object data inputted from the attribute separating unit 66 to the ruled line extracting unit 70, if the "CG" button 82 is depressed. Note that the CG object data and the line-image object data are outputted to the CG object drawing processing unit 50 from the attribute separating unit 66. Accordingly, if the "table" button 80 is depressed, the object is easier to be recognized as a table object, and if the "CG" button 82 is depressed, the object is easier to be recognized as a CG object.

If the "standard" button 86 is depressed, the CG line-image input controller 68A does not output the CG object data to the ruled line extracting unit 70, but outputs the line-image object data to the ruled line extracting unit 70. Note that the CG object data is outputted to the CG object drawing processing unit 50 from the attribute separating unit 66.

Since the "standard" button 86 is provided on the menu screen 78A in the present exemplary embodiment, the table determination parameters 76A used for the processing at the table determining unit 72 include setting values b1 to b4 for a case in which the "standard" button 86 is depressed.

In the present exemplary embodiment, the relationships in the magnitudes of the respective setting values are set to be a1<b1<c1, a2<b2<c2, a3<b3<c3, and a4>b4>c4, for example.

(Third Exemplary Embodiment)

Next, a third exemplary embodiment of the present invention will be described. The components same as those in the above-mentioned exemplary embodiments are identified by the same numerals, and the detailed description will be omitted.

Figure 12:
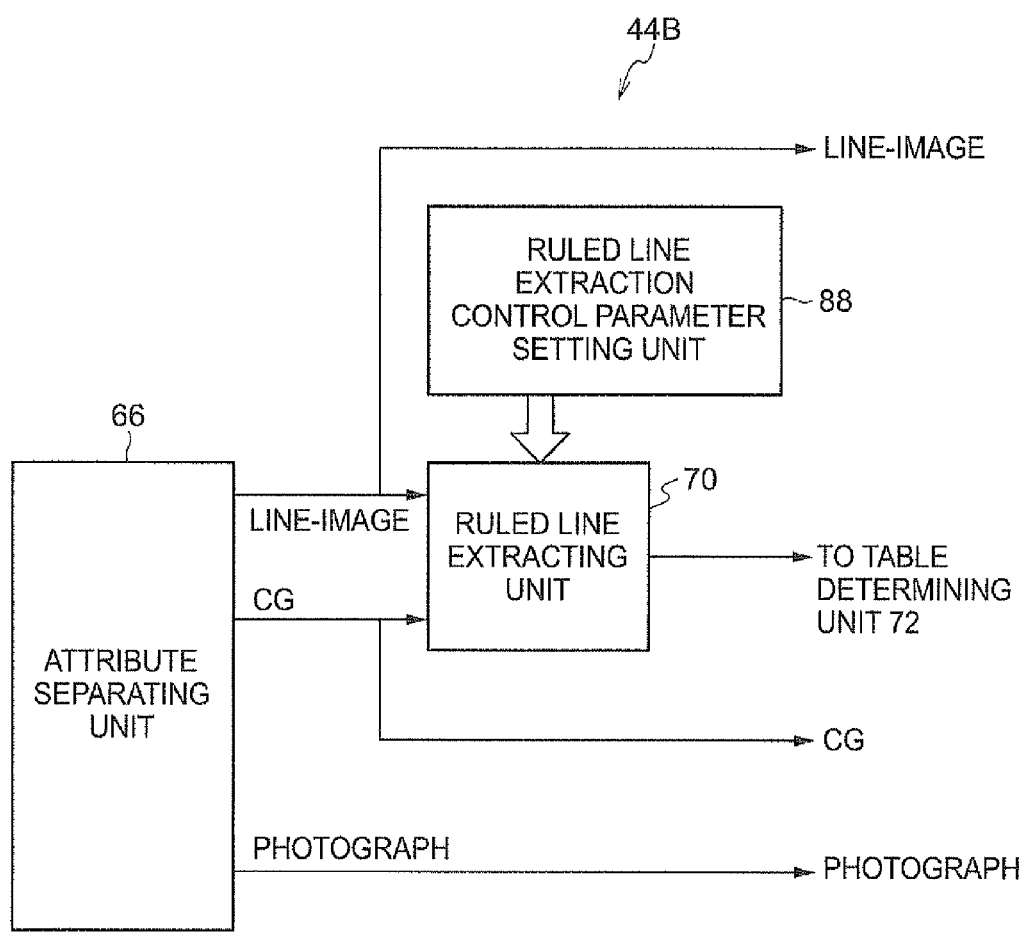
FIG. 12 is a functional block diagram of an object separation processing unit according to a third exemplary embodiment.

FIG. 12 illustrates a functional block diagram of an object separation processing unit 44B according to the present exemplary embodiment. The different point of the object separation processing unit 44B from the object separation processing unit 44 illustrated in FIG. 3 is that a ruled line extraction control parameter setting unit 88 is provided instead of the CG input controller 68. In FIG. 12, the continuous pixel grouping unit 62, the character separating unit 64, the table determining unit 72, and the box-table determining unit 74 are not illustrated.

The ruled line extraction control parameter setting unit 88 outputs a ruled line extraction control parameter, which allows the CG object data and the line-image object data inputted from the attribute separating unit 66 to be easily determined to be a table object, i.e., a ruled line extraction control parameter, which allows the object data to be easily determined to be a table object at the following table determining unit 72 and the box-table determining unit 74, to the ruled line extracting unit 70, if the "table" button 80 is depressed on the setting for the table recognition processing.

The ruled line extraction control parameter setting unit 88 outputs a ruled line extraction control parameter, which allows the CG object data and the line-image object data inputted from the attribute separating unit 66 to be easily determined to be a CG object, i.e., a parameter, which allows the object data to be easily determined to be a CG object at the following table determining unit 72 and the box-table determining unit 74, to the ruled line extracting unit 70, if the "CG" button 82 is depressed.

For example, a ruled line extraction control parameter, as illustrated in FIG. 13, predetermined for each setting of the table recognition processing is set to the ruled line extracting unit 70. The ruled line extraction parameter in FIG. 13 includes, for example, a "maximum continuous pixel length on a line or an outline", a "distance between lines or outlines", a "maximum pixel width of a line or an outline", a "total pixel width on a brake of a line or an outline", and an "average pixel width of a brake on a line or an outline". However, the ruled line extraction parameter is not limited thereto.

As illustrated in FIG. 13, different setting values (threshold values) set to respective ruled line extraction parameters depending upon a case in which the "standard" button 86 is depressed, a case in which the "table" button 80 is depressed, and a case in which the "CG" button 82 is depressed. These setting values are respectively set such that, if the "table" button 80 is depressed, the inputted object is easy to be determined as a table object, and if the "CG" button 82 is depressed, the inputted object is easy to be determined as a CG object. If the "standard" button 86 is depressed, an intermediate value between the setting value if the "table" button 80 is depressed and the setting value if the "CG" button 82 is depressed is set.

In the present exemplary embodiment, the relationships in the magnitudes of the respective setting values are set to be $a1<b1<c1$, $a2<b2$, $a3>b3>c3$, $a4>b4>c4$, and $a5>b5>c5$, for example.

The ruled line extracting unit 70 determines whether the inputted line-image object or the CG object is a table object or not based upon the above-mentioned respective ruled line extraction parameters.

For example, if the setting values $a1$, $b1$, and $c1$ are set for the "maximum continuous pixel length on a line or an outline" as illustrated in FIG. 13, the ruled line extracting unit 70 extracts a candidate of the line or the outline based upon the inputted line-image object data or the CG object data, and obtains the "maximum continuous pixel length on the line or the outline" for the extracted candidate. The ruled line extracting unit 70 compares the obtained maximum continuous pixel length and the setting value, among the setting values $a1$, $b1$, and $c1$, corresponding to the setting for the table recognition processing set by a user, and if the obtained maximum continuous pixel length is the setting value or more, it determines that the object data is a ruled line.

If the setting values $a2$ and $b2$ are set for the "distance between lines or outlines" as illustrated in FIG. 13, the ruled line extracting unit 70 extracts a candidate of the lines or the outlines based upon the inputted line-image object data or the CG object data, and obtains the "distance between the lines or the outlines" for the extracted candidate. The ruled line extracting unit 70 compares the obtained distance and the setting value, of the setting values $a2$ and $b2$, corresponding to the setting for the table recognition processing set by a user, and if the obtained distance is the setting value or more, it determines that the object data is a ruled line.

If the setting values $a3$, $b3$, and $c3$ are set for the "maximum pixel width of a brake of a line or an outline" as illustrated in FIG. 13, the ruled line extracting unit 70 extracts a candidate of the line or the outline based upon the inputted line-image object data or the CG object data, and obtains the "maximum pixel width of the brake of the line or the outline" for the extracted candidate. The ruled line extracting unit 70 compares the obtained maximum pixel width and the setting value, among the setting values $a3$, $b3$, and $c3$, corresponding to the setting for the table recognition processing set by a user, and if the obtained maximum pixel width is the set value or less, it determines that the object data is a ruled line.

If the setting values $a4$, $b4$, and $c4$ are set for the "total pixel width of a brake of a line or an outline" as illustrated in FIG. 13, the ruled line extracting unit 70 extracts a candidate of the line or the outline based upon the inputted line-image object data or the CO object data, and obtains the "total pixel width of the brake of the line or the outline" for the extracted candidate. The ruled line extracting unit 70 compares the obtained maximum pixel width and the setting value, among the setting values $a4$, $b4$, and $c4$, corresponding to the setting for the table recognition processing set by a user, and if the obtained total pixel width is the set value or less, it determines that the object data is a ruled line.

If the setting values $a5$, $b5$, and $c5$ are set for the "average pixel width of a brake of a line or an outline" as illustrated in FIG. 13, the ruled line extracting unit 70 extracts a candidate of the line or the outline based upon the inputted line-image object data or the CG object data, and obtains the "average pixel width of the brake of the line or the outline" for the extracted candidate. The ruled line extracting unit 70 compares the obtained average pixel width and the setting value, among the setting values $a1$, $b1$, and $c1$, corresponding to the setting for the table recognition processing set by a user, and if the obtained average pixel width is the set value or less, it determines that the object data is a ruled line.

The ruled line extracting unit 70 determines whether the object is a ruled line or not for the respective ruled line extraction parameters. For example, if it is determined that the object data is a ruled line for all parameters, the ruled line extracting unit 70 specifies the inputted line-image object or the CG object as a table object, and outputs the object data to the following table determining unit 72. On the other hand, if the object is not determined to be a table object, the inputted line-image object or the CG object is not outputted to the table determining unit 72. Note that the line-image object and the CG object are outputted to the following CG object drawing processing unit 50 from the attribute separating unit 66.

(Fourth Exemplary Embodiment)

Next, a fourth exemplary embodiment according to the present invention will be described. The components same as those in the first exemplary embodiment are identified by the same numerals, and the detailed description will be omitted.

Figure 14:
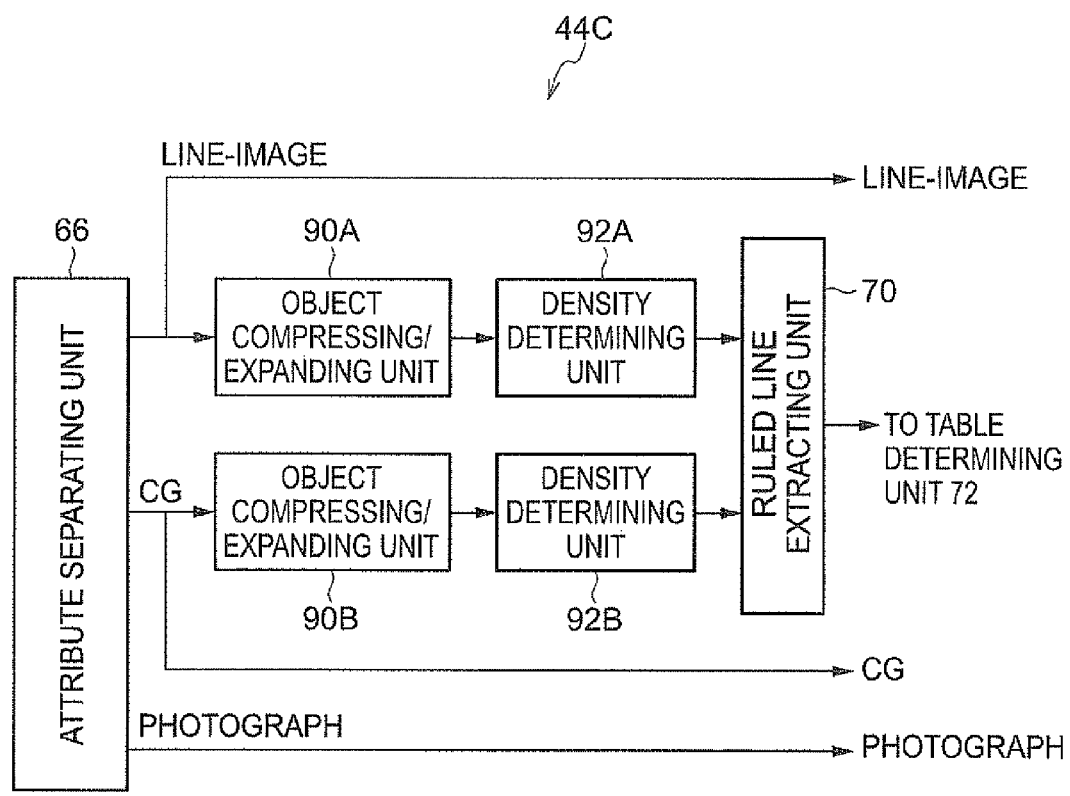
FIG. 14 is a functional block diagram of an object separation processing unit according to a fourth exemplary embodiment.

FIG. 14 illustrates a functional block diagram of an object separation processing unit 44C according to the present exemplary embodiment. The different point of the object separation processing unit 44C from the object separation processing unit 44 illustrated in FIG. 3 is that object compressing/expanding units 90A and 90B, and density determining units 92A and 9213 are provided, instead of the CG input controller 68, between the attribute separating unit 66 and the ruled line extracting unit 70. In FIG. 14, the continuous pixel grouping unit 62, the character separating unit 64, the table determining unit 72, and the box-table determining unit 74 are not illustrated.

The object compressing/expanding units 90A and 90B execute a compression/expansion processing based upon a predetermined compression/expansion pixel number. The object compressing/expanding unit 90A executes the compression/expansion processing to the inputted line-image object data, and outputs the resultant data to the density determining unit 92A. The object compressing/expanding unit 9013 executes the compression/expansion processing to the inputted CG object data, and outputs the resultant data to the density determining unit 92B.

In the compression/expansion processing, the compression processing is performed with the predetermined compression/expansion pixel number, and then, the expansion processing is performed with the predetermined compression/expansion pixel number. A method used for a known noise removal processing and the like is used for this processing.

As the compression/expansion pixel number is greater, an on-pixel tends to be decreased, and as the compression/expansion pixel number is smaller, the on-pixel tends to be increased. In the present exemplary embodiment, the compression/expansion pixel number set to the object compressing/expanding unit 90A, to which the line-image object is inputted, is set to be smaller than the compression/expansion pixel number set to the object compressing/expanding unit 90B, to which the CG object is inputted. Accordingly, the line-image object that is subject to the compression/expansion processing at the object compressing/expanding unit 90A is more emphasized than the CG object that is subject to the compression/expansion processing at the object compressing/expanding unit 9013.

Threshold values a1, b1, and c1 (a1<b1<c1) illustrated in FIG. 15 are respectively set to the density determining units 92A and 92B according to the setting for the table recognition processing. The density determining units 92A and 92B count the pixel number of on-pixels based upon the inputted object data, and compare the counted pixel number of the on-pixels and the threshold value corresponding to the setting for the table recognition processing. Specifically, the density determining units 92A and 92B determine whether the density of the object is the threshold value or more. When the counted pixel number of the on-pixels is the threshold value or more, the density determining units 92A and 92B output the object including the on-pixels to the following ruled line extracting unit 70. If the counted pixel number of the on-pixels is less than the threshold value, the object including the on-pixels is not outputted to the ruled line extracting unit 70. The threshold values set to the density determining units 90A and 90B may be the same or may be different.

In the above-mentioned exemplary embodiments, the setting for the table recognition processing is made by the user's operation on the menu screen. However, the setting may be determined beforehand as a specification of the image forming apparatus. In this case, which one of the "table", "CG", and "standard" is set may be stored in the non-volatile memory 18D or the hard disk 34, for example.

The configuration (see FIG. 1) of the image forming apparatus 12 described in the present exemplary embodiment is only illustrative, and it is needless to say that the unnecessary units may be deleted or new units may be added, without departing from the scope of the present invention.

The flow (see FIG. 8) of the processing of the control program described in the present exemplary embodiment is only illustrative, and it is needless to say that the unnecessary steps may be deleted or new steps may be added, without departing from the scope of the present invention.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. An image processing apparatus comprising:
    a separating unit that separates an image, which includes a plurality of types of partial image, into types of partial image other than a predetermined specific type that is designated as likely to be erroneously separated;
    a setting unit that makes a setting designating whether or not a predetermined two types of partial image of the partial images separated by the separating unit are to be easily determined to be partial images of the predetermined specific type; and
    a determining unit that determines whether or not at least one of the predetermined two types of partial image is a partial image of the predetermined specific type based on the setting made by the setting unit.

2. The image processing apparatus of claim 1, wherein the predetermined two types of partial image are a line-image partial image comprising a line and a graphic partial image comprising a graphic, and the partial image of the predetermined specific type is a table partial image comprising a table, and the determining unit further comprises:
    a ruled line extracting unit that extracts a ruled line included in the line-image partial image or the graphic partial image;
    a table determining unit that determines whether or not the line-image partial image or the graphic partial image is the table partial image based upon a ruled line extraction result from the ruled line extracting unit; and
    a controller that effects control such that if the setting made by the setting unit is a setting designating that the line-image partial image or the graphic partial image is to be easily determined to be the table partial image, the graphic partial image is output to the ruled line extracting unit, and, if the setting made by the setting unit is a setting other than the setting designating that the line-image partial image or the graphic partial image is to be easily determined to be the table partial image, the graphic partial image is not output to the ruled line extracting unit.

3. The image processing apparatus of claim 1, wherein the predetermined two types of partial image are a line-image partial image comprising a line and a graphic partial image comprising a graphic, and the partial image of the predetermined specific type is a table partial image comprising a table, and the determining unit further comprises:
- a ruled line extracting unit that extracts a ruled line included in the line-image partial image or the graphic partial image;
- a table determining unit that determines whether or not the line-image partial image or the graphic partial image is the table partial image based upon a ruled line extraction result from the ruled line extracting unit; and
- a controller that effects control such that if the setting made by the setting unit is a setting designating that the line-image partial image or the graphic partial image is to be easily determined to be the table partial image, the line-image partial image or the graphic partial image is output to the ruled line extracting unit, and, if the setting made by the setting unit is a setting other than the setting designating that the line-image partial image or the graphic partial image is to be easily determined to be the table partial image, the line-image partial image or the graphic partial image is not output to the ruled line extracting unit.

4. The image processing apparatus of claim 1, wherein the predetermined two types of partial image are a line-image partial image comprising a line and a graphic partial image comprising a graphic, and the partial image of the predetermined specific type is a table partial image comprising a table, and the determining unit further comprises:
- a ruled line extracting unit that extracts a ruled line included in the line-image partial image or the graphic partial image based upon a ruled line extraction parameter setting;
- a table determining unit that determines whether or not the line-image partial image or the graphic partial image is the table partial image based upon a ruled line extraction result from the ruled line extracting unit; and
- a controller that effects control such that if the setting made by the setting unit is a setting designating that the line-image partial image or the graphic partial image is to be easily determined to be the table partial image, a ruled line extracting parameter designated for easy extraction of the ruled line is output to the ruled line extracting unit, and if the setting made by the setting unit is a setting other than the setting designating that the line-image partial image or the graphic partial image is to be easily determined to be the table partial image, a ruled line extraction parameter designated for sparing extraction of the ruled line is output to the ruled line extracting unit.

5. The image processing apparatus of claim 1, wherein the predetermined two types of partial image are a line-image partial image comprising a line and a graphic partial image comprising a graphic, and the partial image of the predetermined specific type is a table partial image comprising a table, and the determining unit further comprises:
- a ruled line extracting unit that extracts a ruled line included in the line-image partial image or the graphic partial image;
- a table determining unit that determines whether or not the line-image partial image or the graphic partial image is the table partial image based upon a ruled line extraction result from the ruled line extracting unit;
- a first compressing/expanding unit that compresses or expands the line-image partial image by a predetermined first compression/expansion pixel number;
- a first density determining unit that outputs the line-image partial image to the ruled line extracting unit if the density of the line-image partial image that has been compressed or expanded by the first compressing/expanding unit is greater than or equal to a threshold value set according to the setting made by the setting unit;
- a second compressing/expanding unit that compresses or expands the graphic partial image by a second compression/expansion pixel number that is greater than the first compression/expansion pixel number; and
- a second density determining unit that outputs the graphic partial image to the ruled line extracting unit if the density of the graphic partial image that has been compressed or expanded by the second compressing/expanding unit is greater than or equal to the threshold value set according to the setting made by the setting unit.

6. An image processing method comprising:
performing the following with a processor:
- separating an image including a plurality of types of partial image into types of partial image other than a predetermined specific type that is designated as likely to be erroneously separated;
- making a setting designating whether or not a predetermined two types of partial image of the separated partial images are to be easily determined to be partial images of the predetermined specific type; and
- determining whether or not at least one of the predetermined two types of partial image is a partial image of the predetermined specific type based upon the setting.

7. The image processing method of claim 6, wherein the predetermined two types of partial image are a line-image partial image comprising a line and a graphic partial image comprising a graphic, and the partial image of the predetermined specific type is a table partial image comprising a table, and the determining of whether or not at least one of the two types of partial image is a partial image of the predetermined specific type further comprises:
- extracting a ruled line included in the line-image partial image or the graphic partial image;
- determining or not whether the line-image partial image or the graphic partial image is the table partial image based upon a ruled line extraction result; and
- outputting the graphic partial image to a ruled line extracting unit if the setting designates that the predetermined two types of partial image of the separated partial images are to be easily determined to be the table partial image and, if not, not outputting the graphic partial image to the ruled line extracting unit.

8. The image processing method of claim 6, wherein the predetermined two types of partial image are a line-image partial image comprising a line and a graphic partial image comprising a graphic, and the partial image of the predetermined specific type is a table partial image comprising a table, and the determining of whether or not at least one of the two types of partial image is a partial image of the predetermined specific type further comprises:
- extracting a ruled line included in the line-image partial image or the graphic partial image;
- determining whether or not the line-image partial image or the graphic partial image is the table partial image based upon a ruled line extraction result; and outputting the line-image partial image or the graphic partial image to a ruled line extracting unit if the setting designates that the predetermined two types of partial image of the separated partial images are to be easily determined to be the table partial image and, if not, not outputting the line-image partial image or the graphic partial image to the ruled line extracting unit.

9. The image processing method of claim 6, wherein the predetermined two types of the partial images are a line-image partial image comprising a line and a graphic partial image comprising a graphic, and the partial image of the predetermined specific type is a table partial image comprising a table, and the method further comprises:
- extracting a ruled line included in the line-image partial image or the graphic partial image based upon a ruled line extraction parameter setting;
- determining whether or not the line-image partial image or the graphic partial image is the table partial image based upon a ruled line extraction result; and
- setting the ruled line extraction parameter for easy extraction of the ruled line if the setting designates that the predetermined two types of partial image of the separated partial images are to be easily determined to be the table partial image and, if not, setting the ruled line extraction parameter for sparse extraction of the ruled line.

10. The image processing method of claim 6, wherein the predetermined two types of the partial images are a line-image partial image comprising a line and a graphic partial image comprising a graphic, and the partial image of the predetermined specific type is a table partial image comprising a table, and the method further comprises:
- extracting a ruled line included in the line-image partial image or the graphic partial image;
- determining whether or not the line-image partial image or the graphic partial image is the table partial image based upon a ruled line extraction result;
- compressing or expanding the line-image partial image by a predetermined first compression/expansion pixel number;
- extracting the ruled line from the line-image partial image if the density of the line-image partial image that has been compressed or expanded by the first compression/expansion pixel number is greater than or equal to a threshold value set according to the setting;
- compressing or expanding the graphic partial image by a second compression/expansion pixel number which is greater than the first compression/expansion pixel number; and
- extracting the ruled line from the graphic partial image if the density of the graphic partial image that has been compressed or expanded by the second compression/expansion pixel number is greater than or equal to the threshold value set according to the setting.

11. A non-transitory computer readable medium storing an image processing program causing a computer to execute image processing, the image processing comprising:
- separating an image including a plurality of types of partial image into types of partial image other than a predetermined specific type that is designated as likely to be erroneously separated;
- making a setting designating whether or not a predetermined two types of partial image of the separated partial images are to be easily determined to be partial images of the predetermined specific type; and
- determining whether or not at least one of the predetermined two types of partial image is a partial image of the predetermined specific type based upon the setting.

12. The non-transitory computer readable medium of claim 11, wherein the predetermined two types of partial image are a line-image partial image comprising a line and a graphic partial image comprising a graphic, and the partial image of the predetermined specific type is a table partial image comprising a table, and the determining of whether or not at least one of the two types of partial image is a partial image of the predetermined specific type further comprises:
- extracting a ruled line included in the line-image partial image or the graphic partial image;
- determining or not whether the line-image partial image or the graphic partial image is the table partial image based upon a ruled line extraction result; and
- outputting the graphic partial image to a ruled line extracting unit if the setting designates that the predetermined two types of partial image of the separated partial images are to be easily determined to be the table partial image and, if not, not outputting the graphic partial image to the ruled line extracting unit.

13. The non-transitory computer readable medium of claim 11, wherein the predetermined two types of partial image are a line-image partial image comprising a line and a graphic partial image comprising a graphic, and the partial image of the predetermined specific type is a table partial image comprising a table, and the determining of whether or not at least one of the two types of partial image is a partial image of the predetermined specific type further comprises:
- extracting a ruled line included in the line-image partial image or the graphic partial image;
- determining whether or not the line-image partial image or the graphic partial image is the table partial image based upon a ruled line extraction result; and
- outputting the line-image partial image or the graphic partial image to a ruled line extracting unit if the setting designates that the predetermined two types of partial image of the separated partial images are to be easily determined to be the table partial image and, if not, not outputting the line-image partial image or the graphic partial image to the ruled line extracting unit.

14. The non-transitory computer readable medium of claim 11, wherein the predetermined two types of the partial images are a line-image partial image comprising a line and a graphic partial image comprising a graphic, and the partial image of the predetermined specific type is a table partial image comprising a table, and the method further comprises:
- extracting a ruled line included in the line-image partial image or the graphic partial image based upon a ruled line extraction parameter setting;
- determining whether or not the line-image partial image or the graphic partial image is the table partial image based upon a ruled line extraction result; and
- setting the ruled line extraction parameter for easy extraction of the ruled line if the setting designates that the predetermined two types of partial image of the separated partial images are to be easily determined to be the table partial image and, if not, setting the ruled line extraction parameter for sparse extraction of the ruled line.

15. The non-transitory computer readable medium of claim 11, wherein the predetermined two types of the partial images are a line-image partial image comprising a line and a graphic partial image comprising a graphic, and the partial image of the predetermined specific type is a table partial image comprising a table, and the method further comprises:

extracting a ruled line included in the line-image partial image or the graphic partial image;

determining whether or not the line-image partial image or the graphic partial image is the table partial image based upon a ruled line extraction result;

compressing or expanding the line-image partial image by a predetermined first compression/expansion pixel number;

extracting the ruled line from the line-image partial image if the density of the line-image partial image that has been compressed or expanded by the first compression/expansion pixel number is greater than or equal to a threshold value set according to the setting;

compressing or expanding the graphic partial image by a second compression/expansion pixel number which is greater than the first compression/expansion pixel number; and extracting the ruled line from the graphic partial image if the density of the graphic partial image that has been compressed or expanded by the second compression/expansion pixel number is greater than or equal to the threshold value set according to the setting.

* * * * *